(12) United States Patent
Maybury et al.

(10) Patent No.: US 7,386,542 B2
(45) Date of Patent: Jun. 10, 2008

(54) PERSONALIZED BROADCAST NEWS NAVIGATOR

(75) Inventors: Mark T. Maybury, Chelmsford, MA (US); Warren R. Greiff, Chelmsford, MA (US); Stanley M. Boykin, Randolph, MA (US); Chadwick A McHenry, McLean, VA (US); Lisa M Ferro, New Boston, NH (US)

(73) Assignee: The MITRE Corporation, McLean, VA (US)

( * ) Notice: Subject to any disclaimer, the term of this patent is extended or adjusted under 35 U.S.C. 154(b) by 489 days.

(21) Appl. No.: 10/928,372

(22) Filed: Aug. 30, 2004

(65) Prior Publication Data
US 2006/0047701 A1 Mar. 2, 2006

(51) Int. Cl.
*G06F 17/30* (2006.01)
(52) U.S. Cl. ......................................................... 707/3
(58) Field of Classification Search ...................... None
See application file for complete search history.

(56) References Cited

U.S. PATENT DOCUMENTS

| | | | |
|---|---|---|---|
| 4,739,398 A | 4/1988 | Thomas et al. | |
| 5,187,787 A | 2/1993 | Skeen et al. | |
| 5,371,807 A | 12/1994 | Register et al. | |
| 5,436,653 A | 7/1995 | Ellis et al. | |
| 5,481,296 A | 1/1996 | Cragun et al. | |
| 5,504,518 A | 4/1996 | Ellis et al. | |
| 5,561,457 A | 10/1996 | Cragun et al. | |
| 5,614,940 A | 3/1997 | Cobbley et al. | |
| 5,629,733 A | 5/1997 | Youman et al. | |
| 5,640,553 A * | 6/1997 | Schultz | 707/5 |
| 5,696,963 A | 12/1997 | Ahn | |
| 5,717,923 A * | 2/1998 | Dedrick | 707/102 |
| 5,752,029 A | 5/1998 | Wissner | |
| 5,819,273 A | 10/1998 | Vora et al. | |
| 5,821,945 A | 10/1998 | Yeo et al. | |
| 5,848,410 A | 12/1998 | Walls et al. | |
| 5,918,223 A | 6/1999 | Blum et al. | |
| 5,987,460 A | 11/1999 | Niwa et al. | |
| 6,009,439 A | 12/1999 | Shiomi et al. | |
| 6,064,952 A | 5/2000 | Imanaka et al. | |
| 6,263,507 B1 | 7/2001 | Ahmad et al. | |
| 6,278,446 B1 | 8/2001 | Liou et al. | |
| 6,285,998 B1 * | 9/2001 | Black et al. | 707/4 |
| 6,340,971 B1 | 1/2002 | Janse et al. | |
| 6,766,362 B1 * | 7/2004 | Miyasaka et al. | 709/219 |

(Continued)

OTHER PUBLICATIONS

U.S. Appl. No. 10/689,206, filed Oct. 20, 2003, Maybury et al.

(Continued)

*Primary Examiner*—Diane Mizrahi
(74) *Attorney, Agent, or Firm*—Sterne, Kessler, Goldstein & Fox P.L.L.C.

(57) ABSTRACT

A system and method are provided that use explicitly and implicitly derived models of user information needs and content and presentation preferences together with relevancy feedback to expand a user's original query to the most related terms in a corpus and/or to allow the user to provide interactive feedback to enhance the relevance of selected news stories and display profile of the selected news stories. By personalizing both the selection of stories and the form in which they are delivered, users are provided with tailored broadcast news.

61 Claims, 16 Drawing Sheets

U.S. PATENT DOCUMENTS

| | | | |
|---|---|---|---|
| 6,961,954 B1 | 11/2005 | Maybury et al. | 725/53 |
| 2002/0065802 A1* | 5/2002 | Uchiyama | 707/1 |
| 2003/0014286 A1* | 1/2003 | Cappellini | 705/5 |
| 2003/0154180 A1* | 8/2003 | Case et al. | 707/1 |
| 2004/0098386 A1* | 5/2004 | Thint et al. | 707/3 |
| 2005/0138049 A1* | 6/2005 | Linden | 707/100 |

OTHER PUBLICATIONS

Aberdeen, J. et al., "Description of the Alembic System Used for MUC-6," *Proceedings of the Sixth Message Understanding Conference*, Advanced Research Projects Agency, pp. 6-8 (1995).

Brown, M.G. et al., "Automatic Content-Based Retrieval of Broadcast News," *Multimedia '95*, pp. 35-43 (1995).

"Context Summarization—A Technology Overview," Televitesse Confidential (1997).

Desktop Data, Inc. (1997).

Hauptmann, A.G. et al., "Informedia: News-on-Demand Multimedia Information Acquisition and Retrieval," pp. 214-239.

Liang, Y. et al., "A Practical Video Database Based on Language and Image Analysis," *AAAI Spring Symposium*, pp. 127-132 (1997).

Maybury, M. et al., "Multimedia Summaries of Broadcast News," The MITRE Corporation (1997).

Maybury et al., "Personalcasting: Tailored Broadcast News," *Special Issue on User Modeling and Personalization for TV, International Journal of User Modeling and User-Adapted Interaction*, vol. 14(1), Kluwer Academic, pp. 119-144 (Feb. 2004).

Maybury, M. et al. "Segmentation, Content Extraction and Visualization of Broadcast News Video Using Multistream Analysis," The MITRE Corporation (1997).

Merlino, A. et al., "Broadcast News Navigation Using Story Segmentation," The MITRE Corporation (1997).

Shahraray, B. et al., "Automated Authoring of Hypermedia Documents of Video Programs," *Multimedia '95*, pp. 401-409 (1995).

Tag Frequencies for the Last 3 Months (1997).

Taniguchi, et al., "An Intuitive and Efficient Access Interface to Real-Time Incoming Video Based on Automatic Indexing," *Proceedings of ACM Multimedia '95*, pp. 25-34.

Televitesse, "1996 Annual Report," (1996).

The MITRE Advanced Technology Newsletter, "The Edge," vol. 01(2) (1997).

Zhang, H.J. et al., "Video Parsing, Retrieval and Browsing: An Integrated and Content-Based Solution," *Multimedia '95*, pp. 15-24 (1995).

\* cited by examiner

FIG. 5

News Source

```
ALL News Sources
CNN Headline News
CNN Moneyline 6pm
CNN The Point
Fox 6PM
```
⟵ 1174

Broadcast Dates

⦿ From Date [01▾] [AUG▾] [2001▾]

To Date [03▾] [OCT▾] [2001▾]

○ All Dates

Text Source

☑ Closed Caption

Type of Search

⦿ Custom Search
　☑ Text Search
　☑ Person Search
　☑ Organization Search
　☑ Location Search ○ Profile Search

[A.Merlino: Afghanistan-Iran (Conflict Iran and Afghanistan(Taliban)) ▾] ⟵ 1172

Username : Profile Name (Description)

Topics and/or Tags Selected (01-AUG-2001 Through 08-OCT-2002) — 1496

Text Search
1496A — bush, war
Please separate multiple search terms with a comma ",". ⊙ WIRE search
Search Tips

Person Search
1496B —
AL HUNT
AL JAZEERA
AL QAEDA
ALAN GREENSPAN
ALEXANDRA

Organization Search
1496C —
ABC
ABC NEWS
ABC PRESIDENT DAVID WESTIN
ABC WORLD
ADMINISTRATION

Location Search
1496D —
AFGHANISTAN
AFRICA
AL
ALABAMA
ALASKA

Display [10 ▼] stories per page

Press [Search] to Continue, or [Clear] to reset this form.

PERSONALIZED BROADCAST NEWS NAVIGATOR

BACKGROUND OF THE INVENTION

1. Field of the Invention

The present invention is related to systems and methods for optimizing retrieval and review of Broadcast News via a computer network.

2. Background Art

Broadcast news sources and newspapers provide society with the vast majority of real-time information. Unfortunately, cost efficiencies and real-time pressures demand that producers, editors, and writers select and organize content for stereotypical audiences.

Therefore, what is needed is content understanding, user modeling, and tailored presentation that generates personalcasts through tracking and/or inferring user content interests and display preferences.

BRIEF SUMMARY OF THE INVENTION

An embodiment of the present invention provides a method for dynamically customizing search results (e.g., differences in display and/or content profiles) comprising (a) accessing a display profile corresponding to a user, (b) using a content profile to search a database of information extracted from broadcast news sources to generate the search results, (c) using the display profile to display the search results, (d) determining relevance of the search results, (e) refining, based on the determined relevance, at least one of the display profile and the content profile, and (f) repeating steps (b) through (e) to provide refined search results.

Another embodiment of the present invention provides a system for dynamically customizing a display profile and a content profile used to identify and control display of search results to a user, comprising an authenticator device for authenticating the user, an accessing device for accessing the display profile corresponding to the user, a searching device for searching that uses the content profile to search a database of information extracted from broadcast news sources to generate the search results, a display device for displaying the search results using the display profile, a determining device for determining relevance of the search results, and a refining device for refining at least one of the display profile and the content profile based on the determined relevance.

In a further embodiment, the present invention provides a computer program product comprising a computer useable medium having a computer program logic recorded thereon for controlling at least one processor, the computer program logic comprising computer program code devices that perform operations similar to the devices in the above embodiment.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIGS. 4 and 5 shows enlarged views of screens in the exemplary operation in FIG. 3.

FIG. 11 shows a screen a user initially encounters, according to one embodiment of the present invention.

FIG. 13 shows a screen showing story details of stories in a search result, according to one embodiment of the present invention.

FIG. 14 shows a screen used to enter a search, according to one embodiment of the present invention.

FIG. 15 shows a screen that is retrieved based on the selections in screens of FIGS. 11 and 14, according to one embodiment of the present invention.

Figure 1:
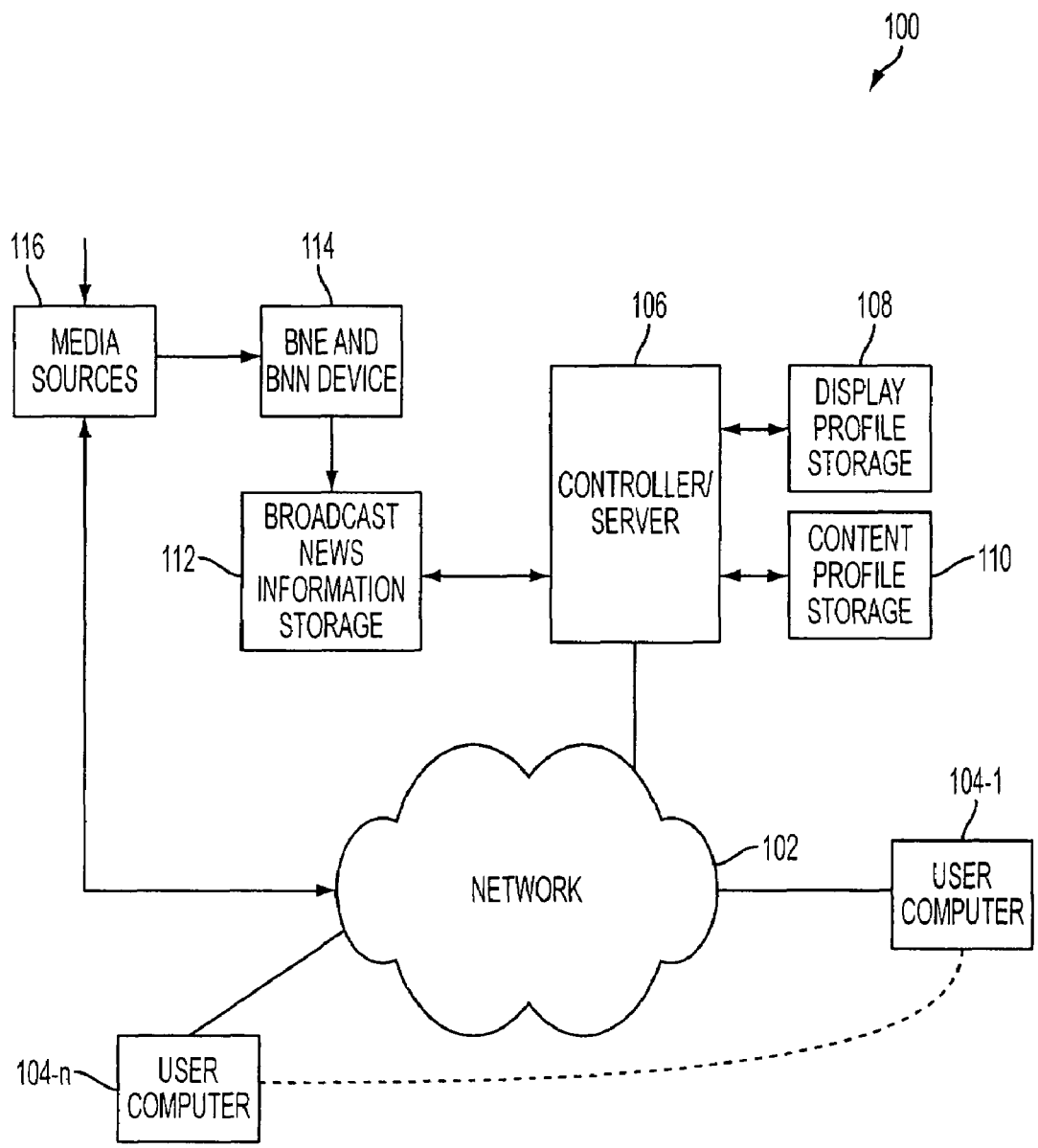
FIG. 1 shows a system, according to one embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

In one embodiment, a system and method are provided that use local context analysis to expand a user's original query to most related terms in a corpus and/or to allow the user to provide interactive feedback to enhance the relevance of selected news stories and the display of search results. By personalizing both the selection of stories and the form in which they are delivered or displayed, users are provided with tailored broadcast news. This individual news personalization provides more fine-grained content tailoring than conventional systems and does not rely on externally provided program metadata.

Overview of Personalcasting

People are offered vast quantities of news in the form of multiple media (text, audio, video, etc). News-on-demand algorithms and technologies provide more convenient access to broadcast news. Applications are being developed to provide on-demand access to multimedia information, such as radio and broadcast news, on a broad range of computing platforms (e.g., kiosk, mobile phone, PDA). Recent systems have been developed that automatically index, cluster/organize, and extract information from news. Synergistic processing of speech, language and image/gesture allow for enhanced interaction at the user interface and enhanced understanding of electronic media, such as web, radio, and television sources.

According to the following description, "personalcast" is being used to mean, for example, a custom created, interactive sequence of stories that are selected based upon specific, individual user interests from a variety of sources and presented in a form tailored to user preferences. An example personalcasting system and method is described in Maybury et al., "Personalcasting: Tailored Broadcast News," Special Issue on User Modeling and Personalization for TV, *International Journal of User Modeling and User-Adapted Interaction*, Vol. 14(1), Kluwer Academic, February 2004, pages 119-144, which is incorporated by reference herein in its entirety.

The integration of methods from user modeling and user-adapted interaction, together with news understanding technologies, allows for new services, such as the delivery of story alerts to interested users as well as interactive, individual news programs that are referred to herein as personalcasts. Peronalcasting is distinct from personalized electronic programming guides (EPGs) in several primary ways: (1) metadata about content (e.g., programs and stories therein) is unavailable in personalcasting, so metadata must be automatically extracted from video sources via speech, text, and image processing; (2) user queries are analyzed linguistically, considering the available large broadcast news corpus; (3) tailoring is performed at a story level, and not a program level; and (4) user tasks are primarily focused on information analysis, and not on entertainment or enjoyment. In personalcasting, interactive search and query refinement improves searching through the use of automated relevance feedback.

Exemplary System

FIG. 1 shows an exemplary system 100, according to one embodiment of the present invention. System 100 includes a network 102 coupling individual user computers or entity computer systems 104 (i.e., 104-1 to 104-*n*, where n=1, 2, 3, . . . ) to a controller/server 106 (hereinafter "controller"). Controller 106 is coupled to a display profile storage device 108, a content profile storage device 110, and a broadcast news information storage device 112. Broadcast news information storage 112 receives news information from broadcast news editor (BNE) and broadcast news navigator (BNN) device 114 (hereinafter "BNE/BNN device 114") coupled to media sources 116 (e.g., audio, video, text, etc. sources). In one example, the BNN portion of the BNE/BNN device 114 is part of controller 106 and receives information from the BNE portion of BNE/BNN device 114.

Network 102 can be a wired or wireless communications system that allows computers 104 to access information in storage devices 108, 110, and/or 112 via controller 106. As examples, network 102 is an internet, intranet, or the like. In one example, each computer 104 functions as a conventional computer, allowing input (e.g., via keyboard or touch screen) and output (e.g., display, printing, audio, graphical, text, etc.) of data.

In one example, controller 106 stores a main program used by computers 104 to perform personalcasting. In other examples, each individual computer 104 stores a program to perform personalcasting.

Although shown as separate storage devices, in one example storage devices 108, 110, and/or 112 are combined into one storage device.

In one example, display profile storage device 108 stores indexed display profiles indexed by user for one or more users. This information contains, but is not limited to, parts of normal display options a user desires to see when results are retrieved after a user query. Other terms that can be used for display profiles are media profiles, display preference profiles, media presentation profile, preference model, or the like.

As described in more detail below, content profile storage 110 stores indexed content profiles indexed by user or by user/topic for one or more users. Content profiles relate to previous searches or search strings for one or more topics that a specific user or set of users has performed. Storing content profiles can allow for saving time during subsequent searches so that searches producing desired results can be used to retrieve new news stories or be used as starting points for additional searching. Another term for content profile is interest model.

Figure 2:
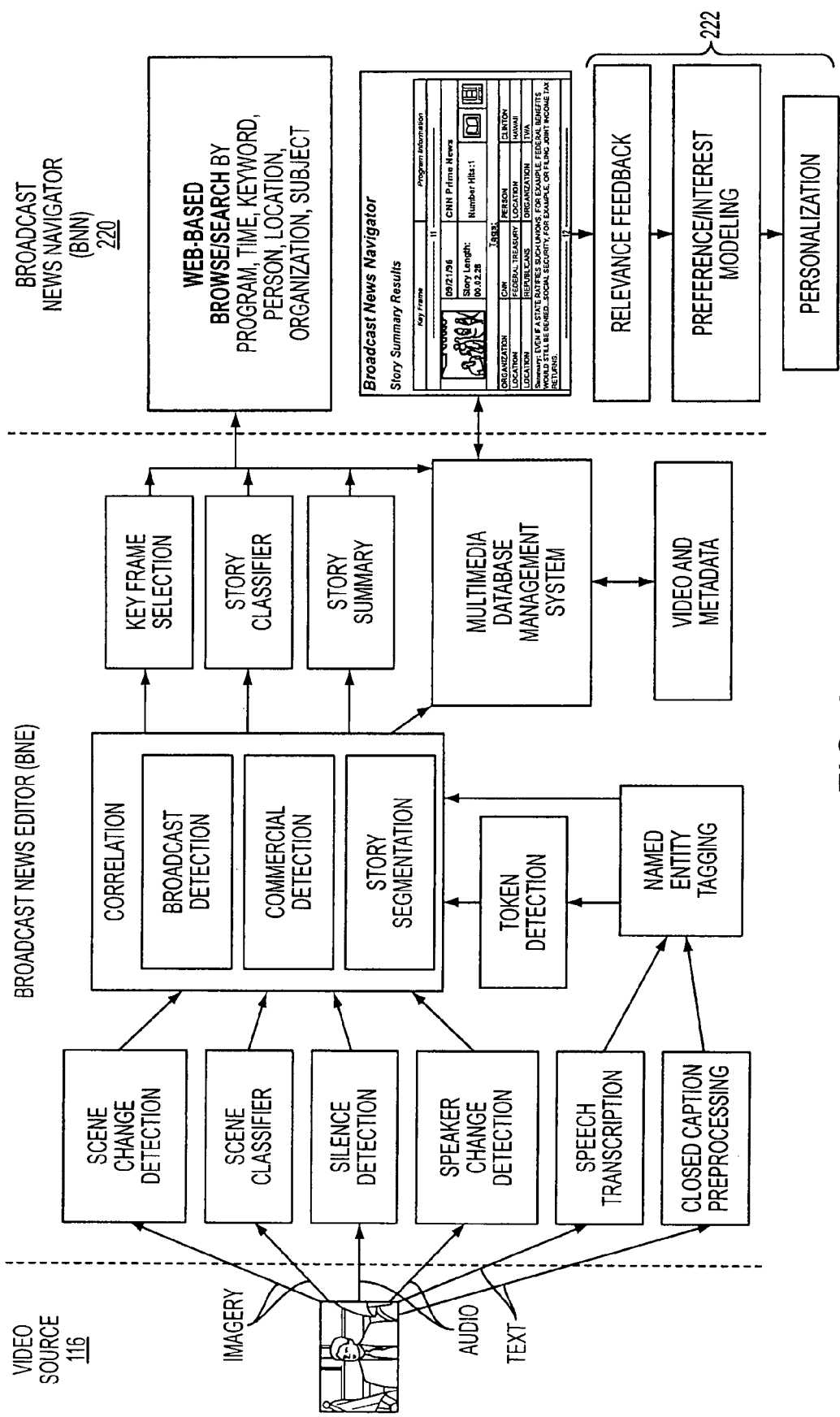
FIG. 2 shows a Broadcast News Editor and Broadcast News Navigator system used within the environment of FIG. 1.

FIG. 2 shows an operational flow diagram 220 of how BNE/BNN device 114 extracts information from media source 116, which is stored in broadcast news information storage 112. The operation of flow diagram 220, apart from portion 222, is described in U.S. Ser. No. 09/033,268, filed Mar. 2, 1998 and 10/689,206, filed Oct. 20, 2003, to Maybury et al., which are both incorporated by reference herein in their entireties. Portion 222 is a personalcasting operation performed in the environment of FIG. 1, which is described in more detail below.

Figure 3:
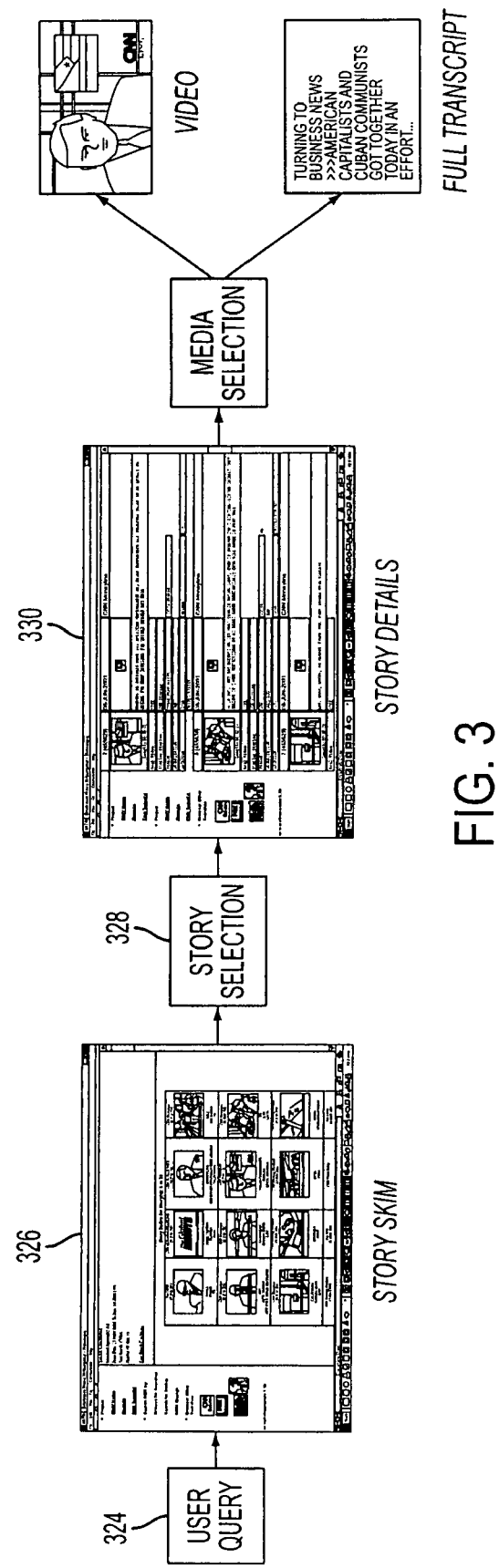
FIG. 3 shows exemplary operations of the system in FIG. 1, according to one embodiment of the present invention.
Figure 4:
Figure 5:
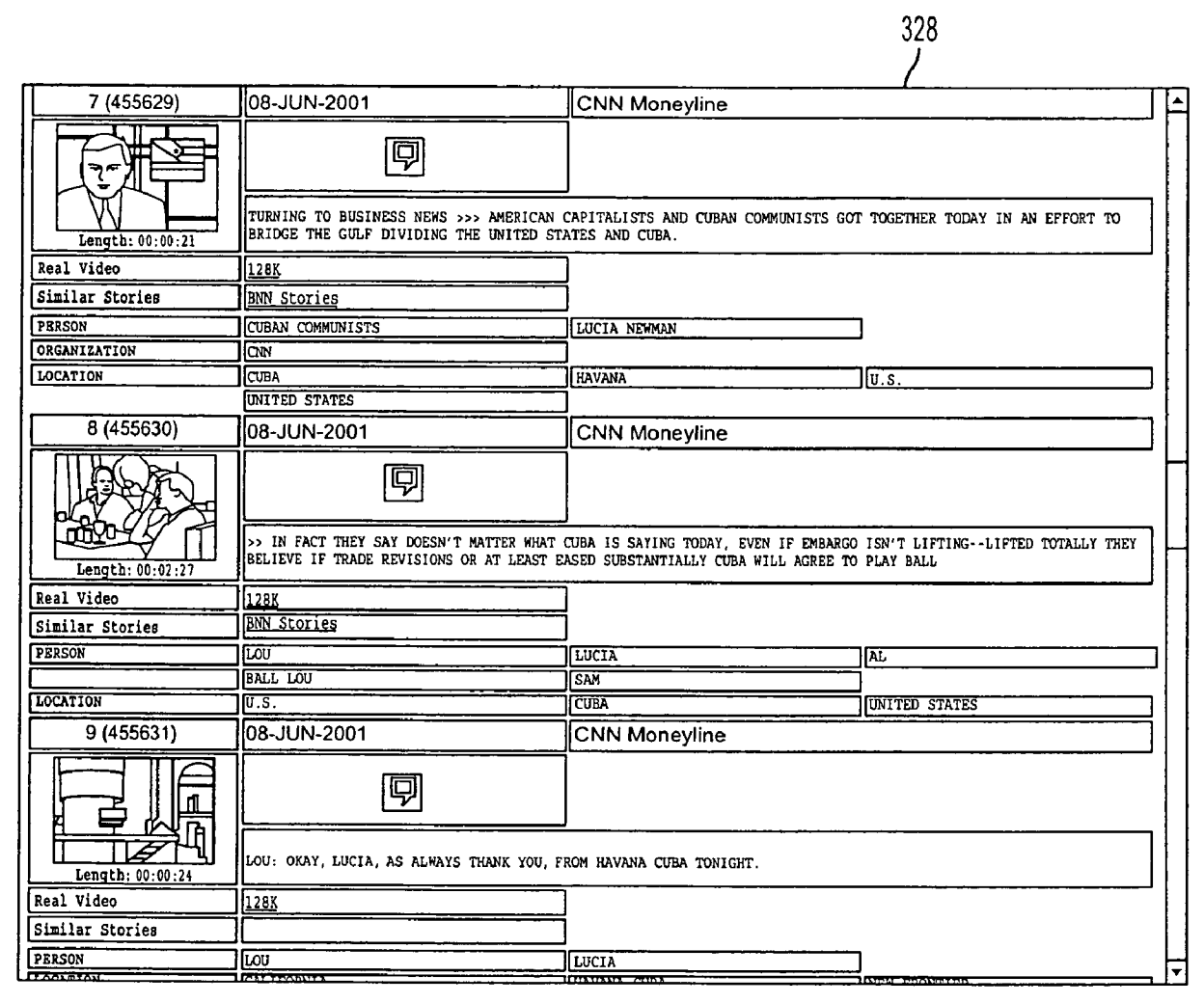

FIG. 3 shows an exemplary display sequence of query results, and FIGS. 4 and 5 show larger views of graphical user interfaces, display screens, screen shots, or the like (hereinafter and above, all are referred to as "screens" in FIG. 3.

With reference to FIGS. 2, 3, 4, and 5, BNE/BNN device 114 uses video, audio, and closed-caption text information sources to automatically segment, extract, and summarize news programs. For each story matching a query 324 (FIG. 3), controller 106 presents a key frame, the three most frequent named entities within the story, and the source and date of the story. This screen is called a "Story Skim" 324 (FIGS. 3 and 4). This, in essence, provides the user with a specific topic channel of information, tailoring the channel to their information interests. Moreover, the user can create arbitrarily complex queries combining key words, named entities (e.g., people, organizations, locations), sources (e.g., CNN, MS-NBC, ABC), programs (e.g., CNN Prime News vs. CNN Headline New vs. CNN Moneyline, etc.), and time intervals (e.g., specific days, weeks, or years). These queries result in selected video stories specific to their interests.

In step 328 (FIG. 3), the user can then select any of the key frames to get access to a "Story Details" screen 330 (FIGS. 3 and 5). In one example, "Story Details" screen 330 gives the user access to all people, organizations, and locations mentioned in the story, an automatically extracted one-line summary of the news (e.g., a sentence with the most frequently named entities), a key frame extracted from the story segment, and a pointer to the full closed-caption text and video source for review. In one example, BNE/BNN device 114 provides navigation support, so that the user can select named entities and find stories including them. Further, by employing a clustering algorithm, controller 106 enables the user to select stories similar to the current story. Users perform both standing queries and ad-hoc searches. A user can subscribe to be alerted (e.g., via email) when a story containing a keyword or named entity is found. As we discuss in the subsequent sections, system 100 uses BNE/BNN 114, controller 106, and storage devices 108, 110, and 112 to allow for personalization, as well as query expansion using Local Context Analysis (LCA).

Exemplary Personalcasting Operation

Figure 6:
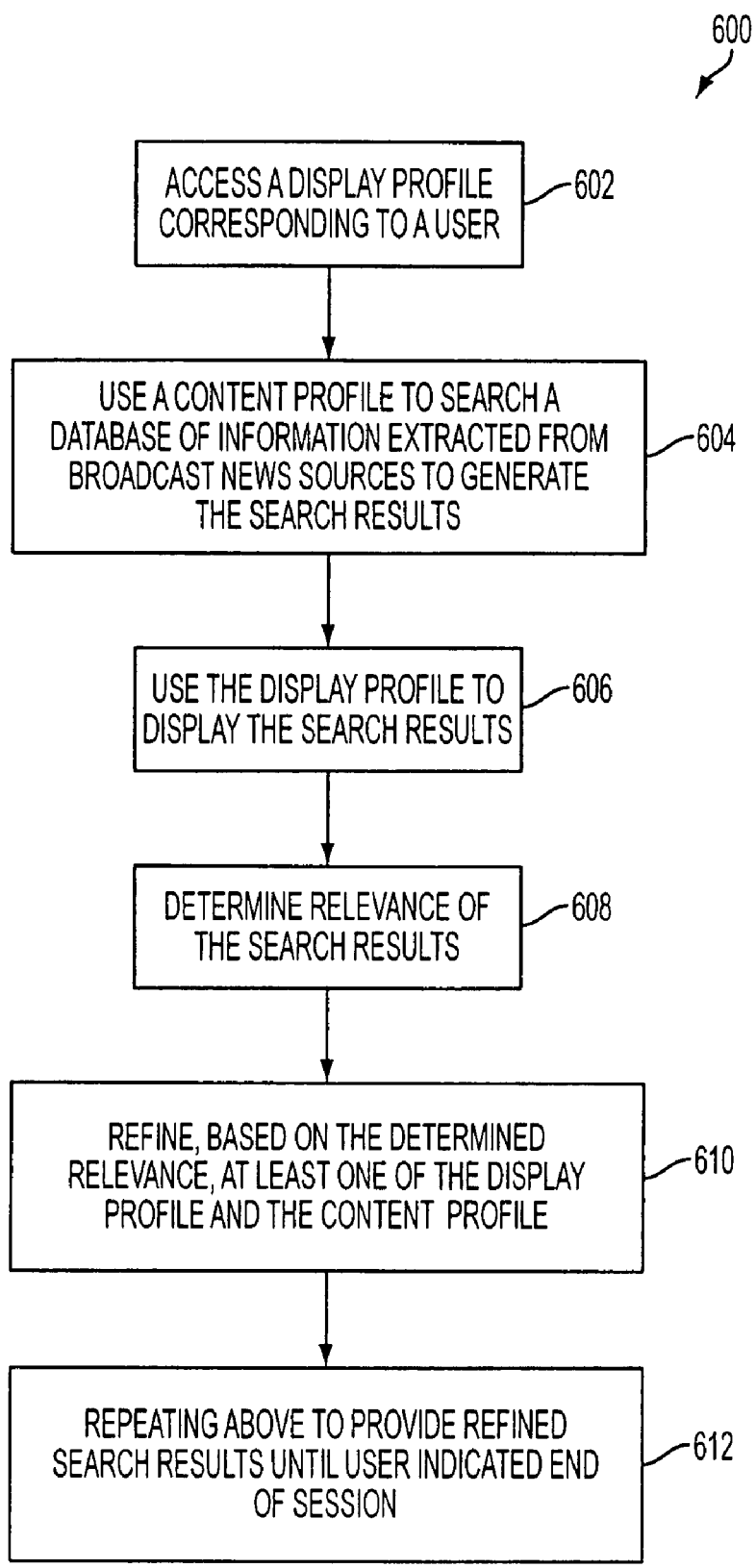
FIG. 6 shows a flowchart depicting a method, according to one embodiment of the present invention.

FIG. 6 is a flowchart depicting a method 600, according to one embodiment of the present invention. In one example, method 600 is a method for dynamically customizing search results, which can be updating differences in display and/or content profiles in storage devices 108 and 110. Method 600 can be performed using controller 106, computer 104, or partially by each.

In step 602, a display profile of a current user is accessed. In one example, this step is proceeded by an authentication step. Also, if this is a first time user, a display profile option screen will appear so that a user can set an initial display profile or possibly choose from optional preset display profiles.

In step 604, a content profile is used to search a database of information extracted from broadcast news sources to generate a search result. For example, storage 112 can be searched using a previously stored content profiled from storage 110. In another example, freehand text is input by the use at computer 104 instead of using a previously stored content profile. In another example, various terms are chosen from a screen. In another example, a combination of these methods are used.

In step 606, a display profile is used to display results. In one example, the display profile is accessed from storage 108 as being linked to the used. In another example, a default display profile can be used if a user is new or does not access their previously saved display profile, as is discussed above.

In step 608, system 100 determines relevance of the search results. In this embodiment, relevance is determined using explicit or implicit click stream analysis for content profile and/or display profile. It is to be appreciated that collaborative filtering could also be used to determine relevance, in which saved searches of other users in a group can be analyzed to determine a most optimal search string for the current user.

In one example, relevance of content in the search results can be determined either explicitly or implicitly, as described in more detail below. When done explicitly, system 100 uses search results chosen by the user as being relevant. When done implicitly, in one example, system 100 analyses search results accessed by the user to determine most used common terms in the viewed search results.

In another example, relevance of parts of the display can be determined explicitly or implicitly, as described in more detail below. When done explicitly, a user is prompted to check which portions of the display they wish to view during subsequent searches. When done implicitly, in one example, system 100 analyses which portions of the display a user most often chosen, does not choose a lot, or does not choose at all.

In step 610, at least one of a display profile or a content profile is refined based on the determined relevance. In one example, refining can be to update the stored display profile or content profile based on the implicit and/or explicit relevance. Updating the content profile, in one example, generates an expanded word list of more relevant terms that are common and/or most used in the result(s) chosen.

In step 612, steps 602-610 are repeated to provide refined search results unless or until the user ends the session.

In one example, an additional step is provided where content and/or display profiles are updated.

In one example, this is done automatically during or after a session using the implicit and explicit choices of a user during that session.

In another example, a user is prompted during or after the session to see if they would like to update either or both of the content and display profiles. In regards to display profiles, the prompt may appear after a user has chosen only certain display fields a predetermined number of times or after each refinement step before additional searching is performed based on the user's interaction with the search results. In terms of content profiles, the prompt may appear after a search topic changes during a search session or at the end of the entire search session.

Figure 7:
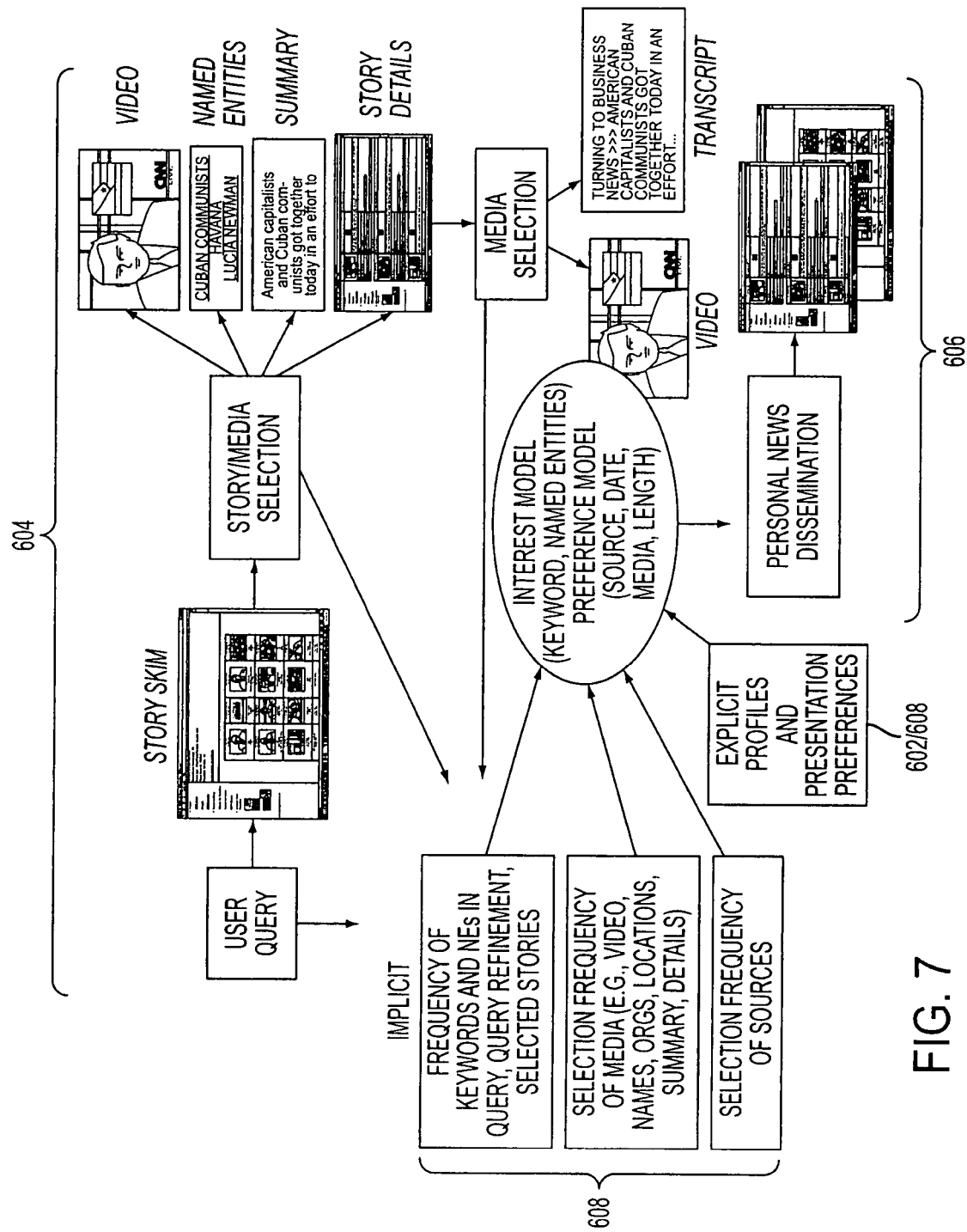
FIG. 7 shows a pictorial flow diagram that pictorially shows the method in FIG. 6, according to one embodiment of the present invention.

FIG. 7 shows a pictorial flow diagram that pictorially shows operation 600, according to one embodiment of the present invention.

In method 600, as shown in FIGS. 6 and 7, users can explicitly define user profiles, which as discussed above include at least interest and display profiles.

Interest profiles indicate a user's interests by specifying simple keywords or named entities, such as individuals, locations, or organizations. They can also specify preferred broadcast sources to search (e.g., CNN, ABC News). The user's interest profiles can be run periodically and the retrieval results sent to the requester as an alert. This alert can be pointers to a story, story skim 326 (FIGS. 3 and 4) or story details 328 (FIGS. 3 and 5).

Display profiles capture preferences for controlling the display of various media elements by manipulating media properties, such as the source, date, time, length, and preference type for media presentation (e.g., key frame only, story details, full video, text summary).

Because the original broadcast news source is segmented into its component parts, key elements can be extracted and others elements can be summarized. This enables a system not only to select stories based on a user's content interest, but also to assemble them in the manner for display as user preferences. For example, the user can be presented with only a key frame, with summary sentences, with people or place names, or with the entire source.

In one example, as discussed above, a feedback and collaborative filtering mechanism is also used. An individual user's model could then be modified with each search or within or across sessions, and the user could benefit from searches performed by others in a community.

Exemplary Computer System

Figure 8:
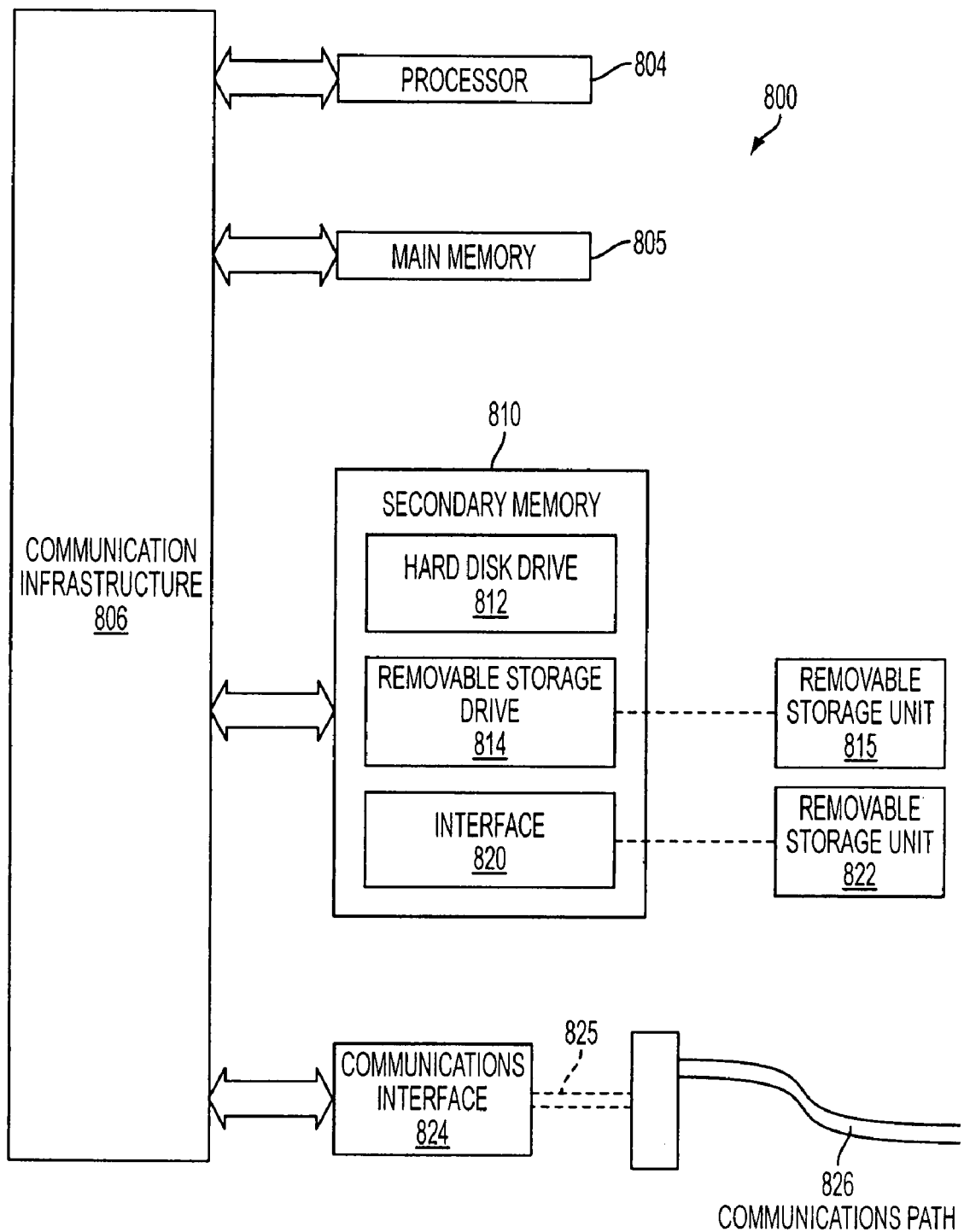
FIG. 8 illustrates an example computer system, in which the present invention can be implemented as computer-readable code.

FIG. 8 illustrates an example computer system 800, in which the present invention can be implemented as computer-readable code. Various embodiments of the invention are described in terms of this example computer system 800. After reading this description, it will become apparent to a person skilled in the relevant art how to implement the invention using other computer systems and/or computer architectures.

The computer system 800 includes one or more processors, such as processor 804. Processor 804 can be a special purpose or a general purpose digital signal processor. The processor 804 is connected to a communication infrastructure 806 (for example, a bus or network). Various software implementations are described in terms of this exemplary computer system. After reading this description, it will become apparent to a person skilled in the relevant art how to implement the invention using other computer systems and/or computer architectures.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCM-CIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

In this document, the terms "computer program medium" and "computer usable medium" are used to generally refer to media such as removable storage drive 814, a hard disk installed in hard disk drive 812, and signals 828. Computer program medium and computer usable medium can also refer to memories, such as main memory 808 and secondary memory 810, that can be memory semiconductors (e.g. DRAMs, etc.) These computer program products are means for providing software to computer system 800.

Computer programs (also called computer control logic) are stored in main memory 808 and/or secondary memory 810. Computer programs may also be received via communications interface 824. Such computer programs, when executed, enable the computer system 800 to implement the present invention as discussed herein. In particular, the computer programs, when executed, enable the processor 804 to implement the processes of the present invention, such as operations in controller 106 and computers 104 discussed above. Accordingly, such computer programs represent controlling systems of the computer system 800. Where the invention is implemented using software, the software may be stored in a computer program product and loaded into computer system 800 using removable storage drive 814, hard drive 812 or communications interface 824.

The invention is also directed to computer products comprising software stored on any computer useable medium. Such software, when executed in one or more data processing device, causes the data processing device(s) to operation as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

Query Expansion And Relevance Feedback: Local Context Analysis

Figure 9:
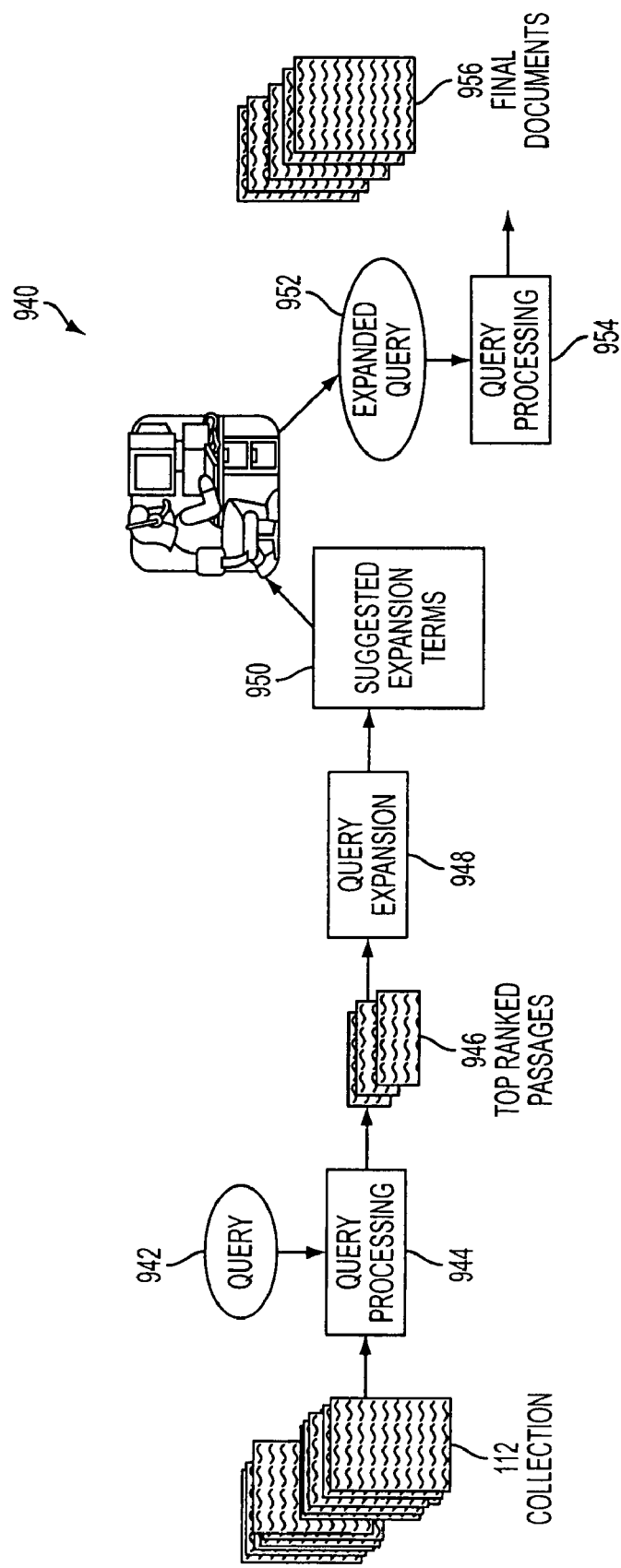
FIG. 9 illustrates a control flow of a local context analysis (LCA) operation, according to one embodiment of the present invention

FIG. 9 illustrates a control flow 940 of a local context analysis (LCA) operation, according to one embodiment of the present invention. This can be performed in either controller 106, computer 104, or partially in each. In this embodiment, two methods are used to find information relevant to users' information needs. First, an original query is expanded to include other most related terms in storage 112 (FIG. 1). Second, relevance feedback is allowed, as in step 608 (FIGS. 6 and 7), so stories are provided for a current search that are similar to those indicated as being relevant during a previous search.

In one example, query expansion is done using control flow 940. Using control flow 940, given a query 942 specified by the user, query processing 944 is performed, using controller 106, to select those passages of information in storage 112 containing at least one of the terms. Also, a Retrieval Status Value (RSV) is assigned to each of these passages according to the scoring formula. In one example, an Okapi formula is used, which is commonly considered one of the most robust and effective formulas developed to date for information retrieval. What is treated as a passage is application dependent. Passages can be paragraphs or paragraph-sized fixed windows of text. Sentences can also be treated as passages. At the other extreme, entire documents can be the passages used for LCA. In an example being discussed, a passage is considered as co-extensive with a news story.

During step 944, top rated passages are mined for promising concepts that can be used as additional query terms. In one example, concepts are simple words. In other examples, concepts correspond to any lexical, syntactic or semantic marking of documents. For example, the use of named entities as concepts may be desired for analyzing broadcast news information. Alternatively, concepts can be limited to some subset of named entities, persons, for example. In one example, a user controls the concept space on a per-query basis. User intuition may deem persons to be critical elements for one information need, where locations are likely to be most helpful for another. Syntactic units, such as noun or verb phrases, can also serve as concepts.

Once passages have been scored and ranked, in step 946 LCA selects the top N ranked passages and considers all the concepts appearing at least one time in these top N passages.

In one example, each concept is then scored using the following formula:

$$f(c) = \prod_{i=1}^{M} [0.1 + \text{co\_degree}(c, w_i)]^{idf(w_i)}$$

$$\text{co\_degree}(c, w_i) = idf(c) \cdot \frac{\log(co(c, w_i) + 1)}{\log(N)}$$

$$co(c, w_i) = \sum_{p \text{ is a passage}} f_{p,w_i} \cdot f_{p,c}$$

$$idf(x) = \min\left(1.0, \frac{\log(N/N_x)}{5.0}\right)$$

For each of the M query terms, $w_i$, a value $co(c,w_i)$ is calculated. The co function measures how much the concept c co-occurs with term $w_i$. Each passage that contains both the concept and the term contributes a value. This value is equal to the product of the number of times c occurs and the number of times $w_i$ occurs in the passage. The log of this measure (1 is added to avoid the possibility of taking the log of 0) is normalized relative to one occurrence of both c and $w_i$ in every passage and then multiplied by idf(c), giving the co_degree. The idf statistic is a measure of how rare a word is. The idf formula used for LCA, a variant of idf weighting used in most modern information retrieval systems, is a function of Nc, the number of passages containing the concept c, out of the total set of passages, which is of size N. The fewer passages containing the word, the greater the idf value. The co_degree is a measure of co-occurrence between the concept c and query word $w_i$. A weighted product of the co_degrees (weighted by the idf values for the query words) yields a measure of how valuable the candidate concept c is taken to be relative to the given query.

The above LCA formula for scoring concepts is designed to assign high values to concepts co-occurring with a large number of the query terms in a large number of the top ranked passages. The greater the number of passages, the greater the score. The greater the number of terms it co-occurs with in a given passage, the greater the score is incremented for that passage. The number of times these terms occur, as well as the number of times the concept itself occurs, also affect the degree to which a given passage augments the overall score.

In step 948, once all concepts have been evaluated, a predetermined number of the most highly scoring concepts are chosen. These concepts are then added to the original query terms. If necessary, collection statistics, which may not be pre-computed for concepts as they are for simple query terms, are gathered for the expansion concepts.

If a search session has not been ended by the user, a suggested expanded query 950 is presented to the user. The user can then decide on an expanded query 952, which is used in step 954 to generate results with top ranking documents 956.

Figure 10:
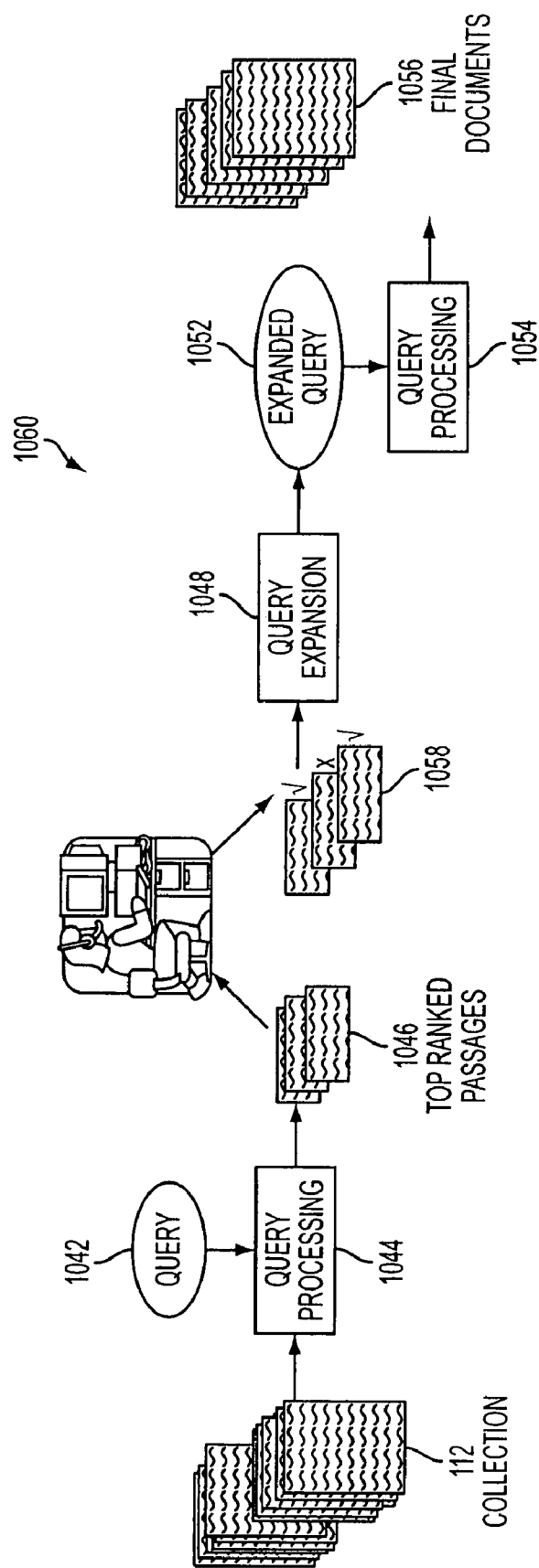
FIG. 10 illustrates a control flow of a local context analysis (LCA) operation that uses relevance feedback, according to an embodiment of the present invention

The following are two examples of query expansion terms resulting from LCA:

initial query1: Palestinian Israeli conflict top 10 query1 expansion concepts: Israel, violence, Palestinians, Hebron, Gaza, gunmen, tanks, city, hamas initial query2: bush budget top 10 query2 expansion concepts: surplus, Medicare, funding, cut, tax, fall, spending, fought, fund, popular FIG. 10 illustrates a control flow 1060 of a local context analysis (LCA) operation that also uses relevance feedback, according to an embodiment of the present invention. Steps 1042-1046 are similar to steps 942-946 discussed above. A difference as compared to control flow 940 is that control flow 1060 includes top documents retrieved 1058 and documents indicated by a user as being relevant to their information needs. Query expansion 1048 proceeds similar to 948, but only the stories marked as relevant by the user will be used for selecting expansion concepts 1052 in place of the top N stories resulting from the original query.

These alternatives can be combined in various ways. Both the top relevant documents and a list of suggested expansion terms can be generated in response to the initial query. The user can then choose to reformulate the query based on the list of suggested terms and, possibly a quick review of the top ranked documents to get a sense of how the system responded to the initial query, or simply mark the retrieved documents as to relevance. In either case, the system can respond with both a new set of documents and an updated list of potential expansion terms. This cycle can be repeated any number of times. In addition, during any given interaction, the user can request that the system apply automatic query expansion and return the results of a feedback cycle in place of the list of candidate expansion terms and the top ranked documents from the unexpanded query.

User Interests And Preferences

There are a number of methods that can be applied to create and exploit a model of user interests and preferences. Regarding user interests and/or information needs, typically these are captured in the form of content profiles explicitly stated by the user. This can occur in a user profile, in which a user can specify their information needs either as a list of keywords and/or a list of named entities, e.g., people, organizations, or locations, as illustrated in FIG. 11.

FIG. 11 is a first screen 1170 a user sees, according to one embodiment of the present invention. In one example, this is shown on computer 104 (FIG. 1) during step 604 (FIG. 6). Screen 1170 allows a user to select program sources, dates, and type of search (e.g., keyword or named entities). A drop list 1172 of stored content profiles is displayed, which in one example are accessed from storage 110 (FIG. 1). In this example screen 1170, a stored profile in drop list 1172 is for user "Amerlino" for stories related to conflicts between Afghanistan and Iran. A user can explicitly specify their preferences for particular new sources (e.g., CNN, Fox, ABC News) or programs (e.g., CNN Headline News vs. CNN Moneyline) using box 1174, dates (e.g., last three days) or time periods using area 1176, information sources (e.g., closed captions, speech transcripts) using area 1178, and type of search (e.g., keyword/text search or named entity search) using area 1180.

Figure 12:
FIG. 12 shows a screen a user encounters to choose or update a display profile, according to one embodiment of the present invention.
Figure 13:
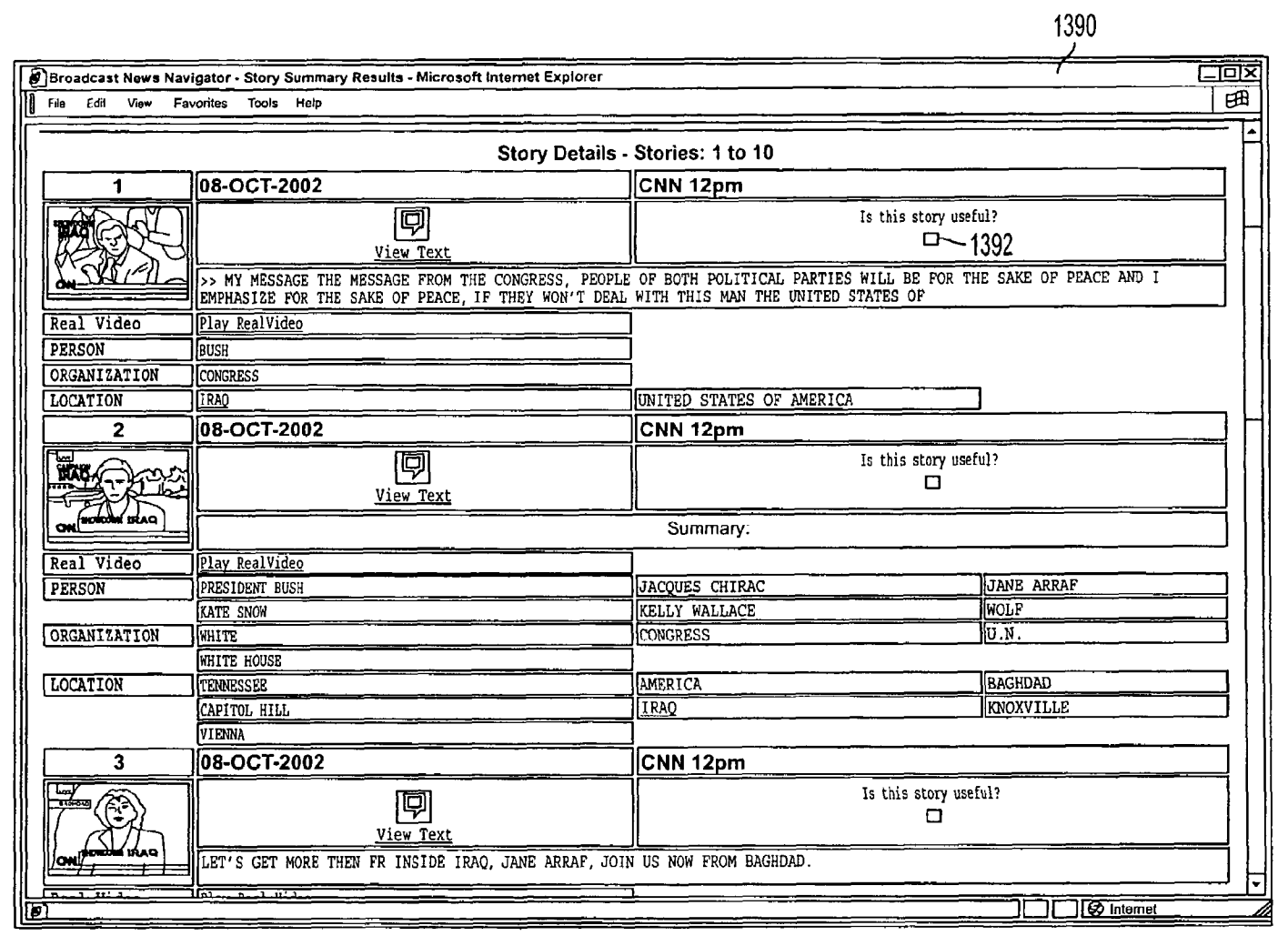

FIG. 12 shows an exemplary screen 1282 a user encounters to choose or update a display profile. The user can select types of media (e.g., key frame picture from a clip, text transcript, video) in area 1284, media properties (e.g., clip length, date, source) in area 1286, and/or content (e.g., types of named entities, related stories) in area 1288 that they desired to have displayed when viewing a story details screen 1390 (FIG. 13). In the example shown, the user has selected all media elements except for similar stories, clip length, and skimmed results. All of these elements are automatically extracted from source stories.

FIG. 13 shows an exemplary screen 1390 displaying story details of stories in a search result. Screen 1390 is similar to screen 328 (FIGS. 3 and 5), except a box 1392 labeled "Is this story useful?" is displayed. Box 1392 can be used during step 608 (FIGS. 6 and 7) to explicitly determine relevancy of results.

Based upon preferences selected in FIG. 12, only two and a half stories are being displayed on screen 1390. If the user had established a profile stating a preference for only one-line summaries, about twice as many stories could be displayed. However, the automatically generated one-line summary fails completely in story 2. The user would have no description of this story in a summary-only display. Desirably, the user is provided the flexibility of choice in presentation.

As discussed above in regards to step 608 (FIGS. 6 and 7) and other operations, a user's interests is determined not only by what they indicate interest in explicitly (e.g., their search keywords and/or named entities), for example by using box 1392, but also by reasoning about terms and/or entities related to their stated interests, e.g., implicitly. For example, if a user searches for stories about the location (e.g., Iraq), the story set returned is analyzed and it might be determined that the person "Saddam Hussein" occurs frequently. Or if the person searches for stories in which the name "Saddam Hussein" and location "Iraq" appear, she might frequently find the terms "weapons of mass destruction" or "UN inspections".

FIG. 14 shows an exemplary screen 1496 used to enter a search. In one example, screen 1496 appears after screen 1170. The choices presented to the user in screen 1490 include options for searching any named entity category, for example, but not limited to, a free-form text search in area 1496A, a person in area 1496B, an organization in area 1496C, and a location in area 1496D.

After selecting sources, time range, and the type of search in screen 1170 (FIG. 11) the user is presented detailed search tool screen 1496 (FIG. 14). For each category selected in screen 1170, a selectable menu of actual named entities with the ability to select one or more elements appears in screen 1496. Since the text option was selected, a free form text box 1496A appears above the selectable menus. In this example, the user types in the terms "bush" and "war."

Figure 15:
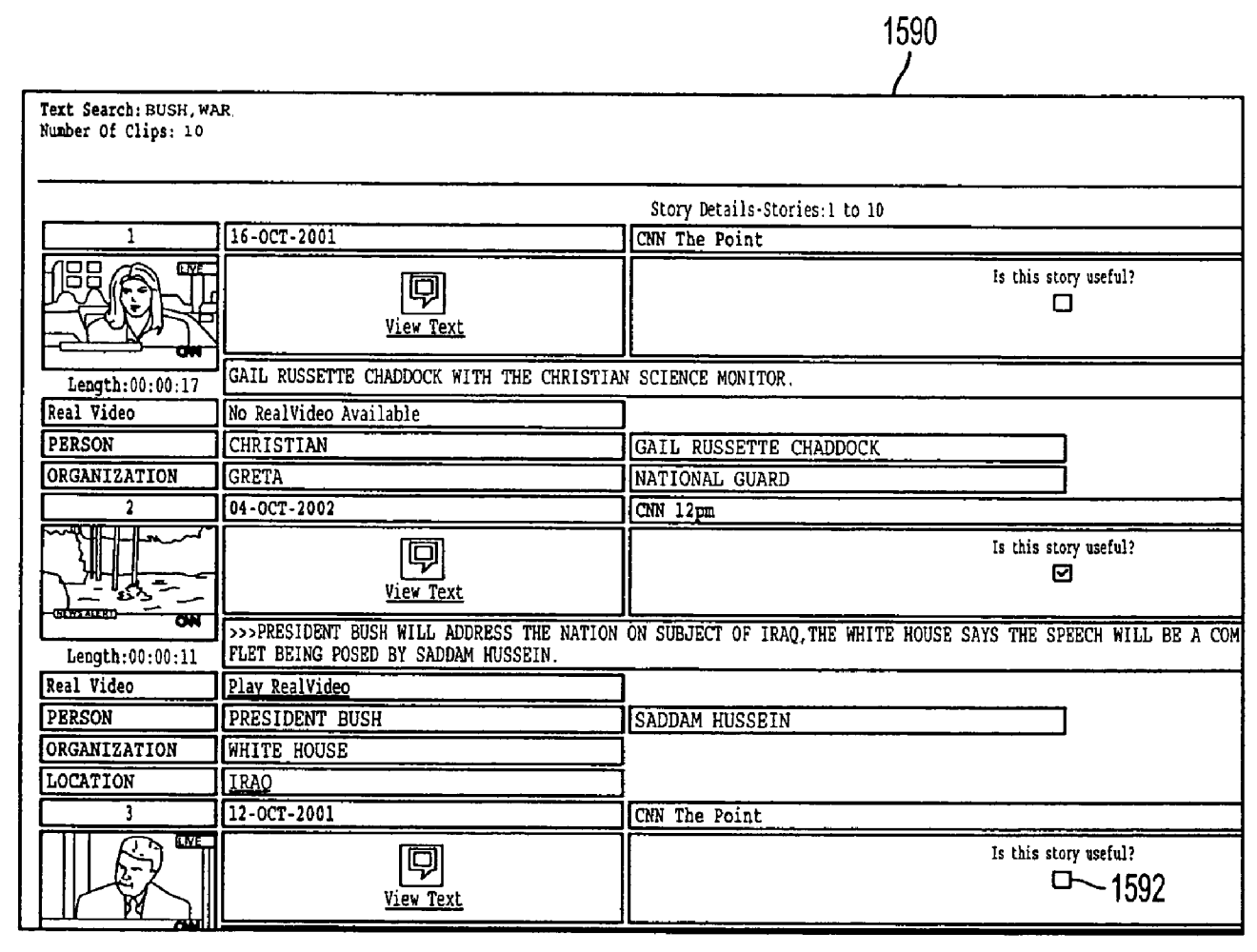

FIG. 15 shows an exemplary screen 1590 that is retrieved based on the selections in screens 1170 and 1496. This example includes a set of stories that are about "Bush" and "war." The user then selects stories that they find most relevant to their information need either explicitly using box 1592, for example in this case the second story that is about the threat posed by Saddam Hussein in Iraq, or implicitly as discussed above.

Controller 106 (FIG. 1) or computer 104 (FIG. 1) then uses LCA to expand the user's query terms, for example to perform step 610 (FIGS. 6 and 7) or other refinement operations discussed above. In particular, the terms "Bush" and "war" are expanded into a list which is displayed in FIG. 16 in area 1696E. The expanded list includes person names such as "Donald" and "Rumsfeld," terms such as "developments" and "money," adjectival locations such as "Pakistani," and so on, as described above.

Figure 16:
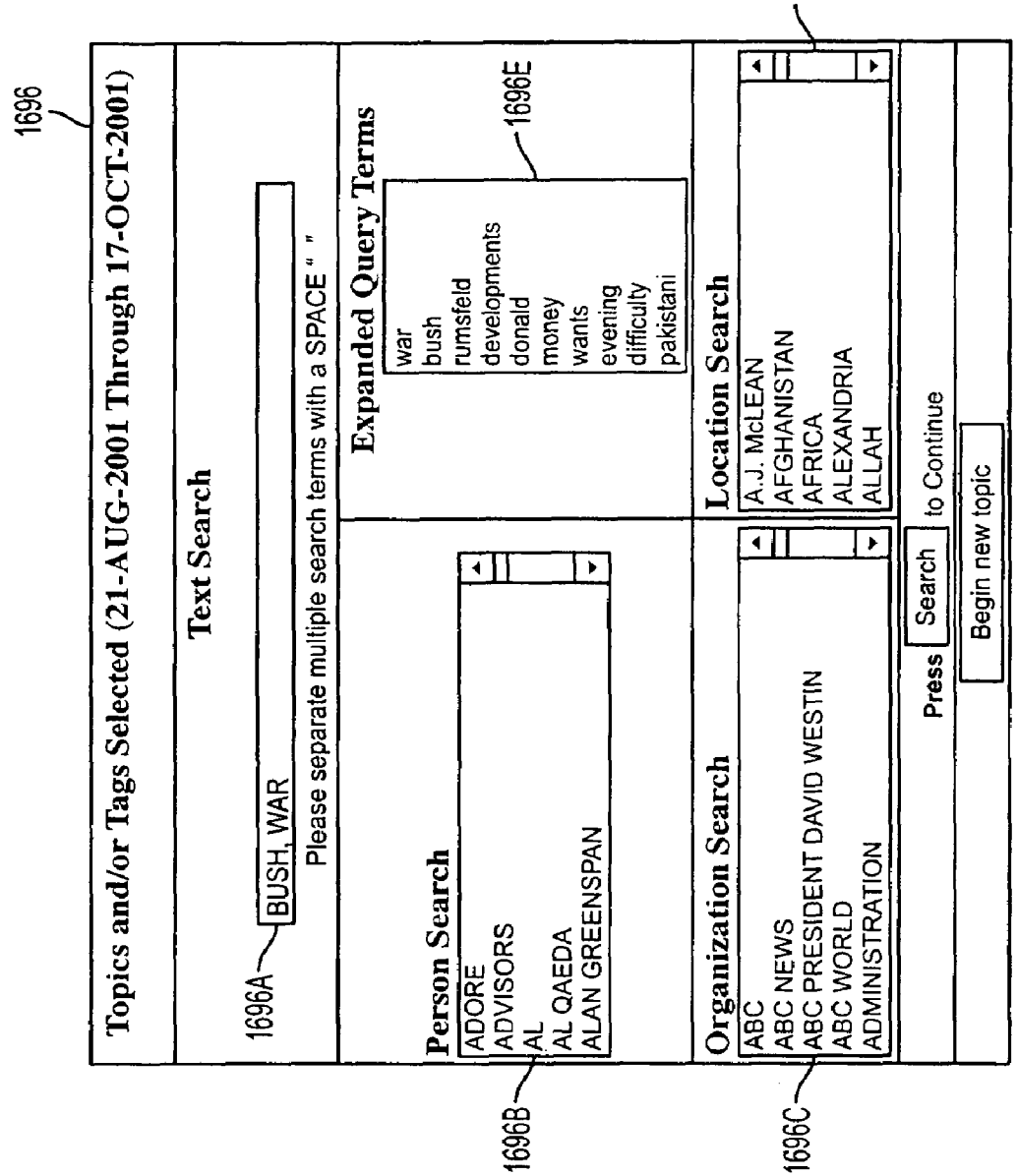
FIG. 16 shows a screen used to enter a search having an expanded term area, according to one embodiment of the present invention.

In the example in FIG. 16, the user selects the term "Iraq" from the location menu and then reruns the query, expanded now to include the terms "Bush", "war", and "Iraq", for example to perform step 612 (FIGS. 6 and 7) or similar operations discussed above.

Another screen similar to screen 1590 (FIG. 15) would then be shown with updated results from the refined search. The user can again select a box similar to 1592 for those stories from the returned story list that they deem most relevant to their information needs. The most frequently occurring terms in these selected stories will be added to further refine the user's query as discussed above.

Additional Aspects

Automatic Logging And Inference Of User Interests

With users increasingly learning, working, and playing in digital environments, monitoring user interactions is feasible and has shown value. In information seeking sessions, detecting selections and rejections of information provides an opportunity to induce individual and group profiles that can assist in content selection and presentation generation. For example, each of the user actions shown in FIG. 8 (e.g., query, story selection, media selection) affords an opportunity for modeling user interest in the first two actions and/or preference in the last. In addition to explicit user interest collection, an implicit method could build an interest model by watching the user session to track the user's query, selection of particular stories, and choice of media. The system could then automatically construct content interest and display profiles.

Tailoring

More sophisticated mechanisms are required to tailor content to specific topics or users. In addition to content selection, material must be ordered and customized to individual user interests. This will require methods of presentation generation that integrate extracted or canned text with generated text.

Information Extraction

Other techniques being developed allow system 100 to automatically summarize, fuse, and tailor selected events and stories. This requires deeper understanding of the source news material beyond extracting named entities, key frames, or key sentences.

Multilingual Content

Because news is global in production and dissemination, it is important to support access to and integration of foreign language content. This poses not only multilingual processing challenges, but also requires dealing with different country/cultural structures and formats.

Cross Story Fusion

An important aspect is not only the summarization of individual stories, but also summarizing across many stories, possibly from different sources or languages. This is particularly challenging when the sources are possibly inconsistent in content or form. This ultimately requires cross story multimodal presentation generation.

Persistence/Transience Of Interest Profiles

Users' information needs tend to change over time, with profiles rapidly becoming out of date. Monitoring user queries and story selections over time is one method that can address this problem. Generalizing from their specific interests can yield an even richer user model.

Evaluation

Community defined multimedia evaluations will be essential for progress. Key to this progress will be a shared infrastructure of benchmark tasks with training and test sets to support cross-site performance comparisons.

System 100 can be considered either a Peronalcasting or Personalized Broadcast News Navigator (P-BNN) system that provides tailored content and presentation of broadcast video news. System 100 uses combined automated video understanding and extraction together with user modeling to provide individualized personalcasts at the story level based on broadcast network news. System 100 supports explicit user content and display profiles, it implicitly reasons about terms co-occurring with user query terms, and it accepts and modifies its model of the user's information need based on user feedback on the relevance of provided content. Accordingly, system 100 overcomes the fixed organization of news programs produced for stereotypical audiences by segmenting, selecting, and reordering content based on user preferences and feedback. Moreover, it represents an advance beyond program-level electronic program guides that are beginning to find their way into the commercial marketplace by not relying upon any externally provided program metadata and by providing more fine-grained content tailoring at the story rather than program level. Accordingly, it is believed this kind of interactive, fine-grained, content-based personalization will be fundamental to television and news understanding systems of the future.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for dynamically customizing a display profile and a content profile used to identify and control display of search results to a user, comprising:
   (a) authenticating the user;
   (b) accessing the display profile corresponding to the user;
   (c) searching a database of information extracted from broadcast news sources using the content profile to generate the search results;
   (d) displaying the search results using the display profile;
   (e) determining relevance of the search results;
   (f) based on the determined relevance, refining at least one of the display profile and the content profile; and
   (g) repeating steps (c) through (f) to provide refined search results.

2. The method of claim 1, further comprising:
   (h) updating a saved display profile based on step (f).

3. The method of claim 1, further comprising:
   (h) storing the refined search.

4. The method of claim 1, where step (f) comprises: providing a set of expanded search terms to the user based on step (e).

5. The method of claim 1, wherein step (c) comprises: extracting indexed and segmented transcripts from the broadcast news sources.

6. The method of claim 1, wherein step (b) comprises selecting at least one of video clip, text transcript, skimmed results, streaming video access, video clip summary, person, organization, location, similar stories, and clip length.

7. The method of claim 1, wherein step (c) comprises using a previously stored interest profile as keywords for the searching.

8. The method of claim 1, wherein step (c) comprises using entered keywords to perform the searching.

9. The method of claim 1, wherein step (c) comprises using at least one of a news sources search, a text search, a person search, an organization search, a location search, a date restricted search, or a stored profile search.

10. The method of claim 1, wherein step (e) comprises:
    (e1) extracting information from the displayed results.

11. The method of claim 10, wherein step (f) comprises: determining a set of terms occurring a predetermined number of times in the extracted information of step (e1).

12. The method of claim 1, wherein step (e) comprises:
    (e1) extracting information from a set of results within the displayed results that are accessed by the user.

13. The method of claim 12, wherein step (f) comprises: determining a set of terms occurring a predetermined number of times in the extracted information of step (e1).

14. The method of claim 1, wherein step (e) comprises:
    (e1) extracting information from a set of results within the displayed results that are chosen by the user as being useful results.

15. The method of claim 14, wherein step (f) comprises: determining a set of terms occurring a predetermined number of times in the extracted information of step (e1).

16. The method of claim 1, wherein step (e) comprises at least one of:
    (e1) extracting information from the displayed results;
    (e2) extracting information from a set of results within the displayed results that are chosen by the user as being useful results; and
    (e3) extracting information from a set of results within the displayed results that are accessed by the user.

17. The method of claim 16, wherein step (f) comprises: determining a set of terms occurring a predetermined number of times in the extracted information correlating to steps (e1), (e2), or (e3) when a respective one of steps (e1), (e2), or (e3) is performed.

18. The method of claim 1, wherein step (f) comprises: requesting whether the user wants to update the display profile each time a user interacts with the displayed results.

19. The method of claim 1, wherein step (f) comprises: requesting whether the user wants to update the display profile at an end of the search session.

20. The method of claim 1, wherein step (f) comprises: automatically updating the display profile to include aspects of the display the user interacts with after a predetermined number of search sessions and exclude aspects of the display the user fails to interact with after a predetermined number of the search sessions.

21. The method of claim 1, wherein step (f) comprises: requesting whether the user wants to save a search string at the end of a search session.

22. The method of claim 1, wherein step (f) comprises: automatically saving a search string at the end of the search session.

23. A system for dynamically customizing a display profile and a content profile used to identify and control display of search results to a user, comprising
- means for authenticating the user;
- means for accessing the display profile corresponding to the user;
- means for searching a database of information extracted from broadcast news sources using the content profile to generate the search results;
- means for displaying the search results using the display profile;
- means for determining relevance of the search results;
- means for refining at least one of the display profile and the content profile based on the determined relevance.

24. The system of claim 23, wherein the means for searching uses indexed and segmented transcripts of text as the information that is extracted from the broadcast news sources.

25. The system of claim 23, wherein the means for accessing selects at least one of video clip, text transcript, skimmed results, streaming video access, video clip summary, person, organization, location, similar stories, and clip length.

26. The system of claim 23, wherein the means for searching uses a previously stored interest profile as keywords for the searching.

27. The system of claim 23, wherein the means for searching uses entered keywords to perform the searching.

28. The system of claim 23, wherein the means for searching uses at least one of a news sources search, a text search, a person search, an organization search, a location search, a date restricted search, or a stored profile search.

29. The system of claim 23, wherein the means for determining relevance extracts relevant results information from the displayed results.

30. The system of claim 29, wherein the means for refining determines a set of terms occurring a predetermined number of times in the information extracted by the means for determining relevant results.

31. The system of claim 23, wherein the means for determining relevance extracts relevant information from a set of results within the displayed results that are accessed by the user.

32. The system of claim 31, wherein the means for refining determines a set of terms occurring a predetermined number of times in the information extracted by the means for determining.

33. The system of claim 23, wherein the means for determining extracts information from a set of results within the displayed results that are chosen by the user as being useful results.

34. The system of claim 33, the means for refining determines a set of terms occurring a predetermined number of times in information extracted by the means for determining relevance.

35. The system of claim 23, wherein the means for determining relevance extracts at least one of information from the displayed results, information from a set of results within the displayed results that are chosen by the user as being useful results, and information from a set of results within the displayed results that are accessed by the user.

36. The system of claim 35, wherein the means for refining determines a set of terms occurring a predetermined number of times in the extracted information.

37. The system of claim 23, wherein the means for refining requests whether the user wants to update the display profile each time a user interacts with the displayed results.

38. The system of claim 23, wherein the means for refining requests whether the user wants to update the display profile at the end of a search session.

39. The system of claim 23, wherein the means for refining automatically updates the display profile to include aspects of the display the user interacts with after a predetermined number of search sessions and exclude aspects of the display the user fails to interact with after a predetermined number of the search sessions.

40. The system of claim 23, wherein the means for refining requests whether the user wants to save a search string at an end of the search session.

41. A computer program product comprising a tangible computer useable medium having a computer program logic recorded thereon for enabling a processor to dynamically customize a display profile and a content profile used to identify and control display of search results to a user, the computer program logic comprising:
- accessing means for enabling a processor to access the display profile corresponding to the user;
- searching means for enabling a processor to search a database of information extracted from broadcast news sources using the content profile to generate the search results;
- displaying means for enabling a processor to display the search results using the display profile;
- determining means for enabling a processor to determine relevance of the search results;
- refining means for enabling a processor to refine at least one of the display profile and the content profile based on the determined relevance.

42. The computer program product of claim 41, wherein the searching means uses indexed and segmented transcripts of text as the information that is extracted from the broadcast news sources.

43. The computer program product of claim 41, wherein the accessing means chooses at least one of video clip, text transcript, skimmed results, streaming video access, video clip summary, person, organization, location, similar stories, and clip length.

44. The computer program product of claim 41, wherein the searching means uses a previously stored interest profile as keywords for the searching.

45. The computer program product of claim 41, wherein the searching means uses entered keywords to perform the searching.

46. The computer program product of claim 41, wherein the searching means uses at least one of a news sources search, a text search, a person search, an organization search, a location search, a date restricted search, or a stored profile search.

47. The computer program product of claim 41, wherein the determining means extracts relevant information from the displayed results.

48. The computer program product of claim 47, wherein the refining means determines a set of terms occurring a predetermined number of times in the information extracted by the computer program code means for determining relevant results.

49. The computer program product of claim 41, wherein the determining means extracts relevant information from a set of results within the displayed results that are accessed by the user.

50. The computer program product of claim 49, wherein the refining means determines a set of terms occurring a predetermined number of times in the information extracted by the computer program code means for determining relevance.

51. The computer program product of claim 41, wherein the determining means extracts information from a set of results within the displayed results that are chosen by the user as being useful results.

52. The computer program product of claim 51, wherein the refining means determines a set of terms occurring a predetermined number of times information extracted by the computer program code means for determining relevance.

53. The computer program product of claim 41, wherein the determining means extracts at least one of (1) information from the displayed results, (2) information from a set of results within the displayed results that are chosen by the user as being useful results, and (3) information from a set of results within the displayed results that are accessed by the user.

54. The computer program product of claim 53, wherein the refining means determines a set of terms occurring a predetermined number of times in the extracted information.

55. The computer program product of claim 41, wherein the refining means requests whether the user wants to update the display profile each time the user interacts with the displayed results.

56. The computer program product of claim 41, wherein the refining means requests whether the user wants to update the display profile at an end of the search session.

57. The computer program product of claim 41, wherein the refining means automatically updates the display profile to include aspects of the display the user interacts with after a predetermined number of search sessions and excludes aspects of the display the user fails to interact with after a predetermined number of the search sessions.

58. The computer program product of claim 41, wherein the refining means requests whether the user wants to save a search string at an end of the search session.

59. The computer program product of claim 41, wherein the refining means automatically saves a search string at the end of the search session.

60. A method for dynamically customizing search results, comprising:
(b) accessing a display profile corresponding to a user;
(c) searching a database of information extracted from broadcast news sources using a content profile to generate the search results;
(d) displaying the search results using a display profile;
(e) determining relevance of the search results;
(g) refining, based on the determined relevance, at least one of the display profile and the content profile; and
(h) repeating steps (c) through (g) to provide refined search results.

61. The system of claim 23, wherein means for refining automatically saves a search string at the end of the search session.

* * * * *

UNITED STATES PATENT AND TRADEMARK OFFICE
CERTIFICATE OF CORRECTION

PATENT NO.        : 7,386,542 B2
APPLICATION NO.   : 10/928372
DATED             : June 10, 2008
INVENTOR(S)       : Maybury et al.

It is certified that error appears in the above-identified patent and that said Letters Patent is hereby corrected as shown below:

Column 14
Line 61, please replace "of the search sessions" with --of search sessions--.

Column 15
Line 49, please replace "for determining" with --for determining relevance--.

Column 16
Line 13, please replace "of the search sessions" with --of search sessions--.
Line 16, please replace "at an end" with --at the end--.

Column 17
Line 12, please replace "times information" with --times in the information--.

Column 18
Line 6, please replace "of the search sessions" with --of search sessions--.
Line 9, please replace "at an end" with --at the end--.

Signed and Sealed this
Twenty-sixth Day of April, 2011

David J. Kappos
*Director of the United States Patent and Trademark Office*